United States Patent
Ovshinsky

(10) Patent No.: US 7,632,582 B2
(45) Date of Patent: Dec. 15, 2009

(54) METHOD AND APPARATUS FOR MAINTAINING HIGH VOLTAGE IN A FUEL CELL

(75) Inventor: Stanford R. Ovshinsky, Bloomfield Hills, MI (US)

(73) Assignee: Ovonic Fuel Cell Company LLC, Rochester Hills, MI (US)

( * ) Notice: Subject to any disclaimer, the term of this patent is extended or adjusted under 35 U.S.C. 154(b) by 806 days.

(21) Appl. No.: 11/220,930

(22) Filed: Sep. 7, 2005

(65) Prior Publication Data

US 2007/0054160 A1 Mar. 8, 2007

(51) Int. Cl.
*H01M 8/00* (2006.01)

(52) U.S. Cl. .............................. 429/13; 429/17; 429/21; 429/40

(58) Field of Classification Search .................. 429/12, 429/13, 17, 21, 40
See application file for complete search history.

(56) References Cited

U.S. PATENT DOCUMENTS

| | | | |
|---|---|---|---|
| 6,605,375 B2 * | 8/2003 | Ovshinsky et al. | 429/13 |
| 6,703,156 B2 * | 3/2004 | Ovshinsky et al. | 429/40 |
| 6,875,536 B2 * | 4/2005 | Ovshinsky | 429/40 |
| 7,087,327 B2 * | 8/2006 | Pearson | 429/12 |
| 7,282,294 B2 * | 10/2007 | Wang et al. | 429/17 X |

* cited by examiner

*Primary Examiner*—Stephen J. Kalafut
(74) *Attorney, Agent, or Firm*—David W. Schumaker

(57) ABSTRACT

A method and apparatus for elevating the operating voltage in a fuel cell having a hydrogen electrode with hydrogen storage capacity and/or an oxygen electrode with oxygen storage capacity. The fuel cell is able to sustain the elevated voltage through application of an electrical current to the fuel cell resulting in the charging of the hydrogen electrode and/or the oxygen electrode.

31 Claims, 4 Drawing Sheets

METHOD AND APPARATUS FOR MAINTAINING HIGH VOLTAGE IN A FUEL CELL

FIELD OF THE INVENTION

The present invention generally relates to fuel cells having one or more electrodes capable of absorbing energy. More particularly, the present invention relates to a fuel cell utilizing the absorption properties of one or more of its electrodes to provide an increase in operating voltage.

BACKGROUND

As the world's population expands and its economy increases, the increase in the atmospheric concentrations of carbon dioxide is warming the earth causing climate changes. However, the global energy system is moving steadily away from the carbon-rich fuels whose combustion produces the harmful gas. Experts say atmospheric levels of carbon dioxide may be double that of the pre-industrial era by the end of the next century, but they also say the levels would be much higher except for a trend toward lower-carbon fuels that has been going on for more than 100 years. Furthermore, fossil fuels cause pollution and are a causative factor in the strategic military struggles between nations. Furthermore, fluctuating energy costs are a source of economic instability worldwide.

In the United States, it is estimated, that the trend toward lower-carbon fuels combined with greater energy efficiency has, since 1950, reduced by about half the amount of carbon spewed out for each unit of economic production. Thus, the decarbonization of the energy system is the single most important fact to emerge from the last 20 years of analysis of the system. It had been predicted that this evolution will produce a carbon-free energy system by the end of the $21^{st}$ century. The present invention is another product which is essential to shortening that period to a matter of years. In the near term, hydrogen will be used in fuel cells for cars, trucks and industrial plants, just as it already provides power for orbiting spacecraft. But, with the problems of storage and infrastructure solved (see U.S. application Ser. No. 09/444,810, entitled "A Hydrogen-based Ecosystem" filed on Nov. 22, 1999 for Ovshinsky, et al., which is herein incorporated by reference and U.S. patent application Ser. No. 09/435,497, entitled "High Storage Capacity Alloys Enabling a Hydrogen-based Ecosystem," filed on Nov. 6, 1999 for Ovshinsky et al., which is herein incorporated by reference), hydrogen will also provide a general carbon-free fuel to cover all fuel needs.

Hydrogen is the "ultimate fuel." In fact, it is considered to be "THE" fuel for the future. Hydrogen is the most plentiful element in the universe (more than 95%). Hydrogen can provide an inexhaustible, clean source of energy for our planet which can be produced by various processes. Utilizing the inventions of subject assignee, the hydrogen can be stored and transported in solid state form in trucks, trains, boats, barges, etc. (see the '810 and '497 applications).

A fuel cell is an energy-conversion device that directly converts the energy of a supplied fuel into electric energy. Researchers have been actively studying fuel cells to utilize the fuel cell's potential high energy-generation efficiency. The base unit of the fuel cell is a cell having an oxygen electrode, a hydrogen electrode, and an appropriate electrolyte. Fuel cells have many potential applications such as supplying power for transportation vehicles, replacing steam turbines and power supply applications of all sorts. Despite their seeming simplicity, many problems have prevented the widespread usage of fuel cells.

Fuel cells, like batteries, operate by utilizing electrochemical reactions. Unlike a battery, in which chemical energy is stored within the cell, fuel cells generally are supplied with reactants from outside the cell. Barring failure of the electrodes, as long as the fuel, preferably hydrogen, and oxidant, typically air or oxygen, are supplied and the reaction products are removed, the cell continues to operate.

Fuel cells offer a number of important advantages over internal combustion engine or generator systems. These include relatively high efficiency, environmentally clean operation especially when utilizing hydrogen as a fuel, high reliability, few moving parts, and quiet operation. Fuel cells potentially are more efficient than other conventional power sources based upon the Carnot cycle.

The major components of a typical fuel cell are the hydrogen electrode for hydrogen oxidation and the oxygen electrode for oxygen reduction, both being positioned in a cell containing an electrolyte (such as an alkaline electrolytic solution). Typically, the reactants, such as hydrogen and oxygen, are respectively fed through a porous hydrogen electrode and oxygen electrode and brought into surface contact with the electrolyte. The particular materials utilized for the hydrogen electrode and oxygen electrode are important since they must act as efficient catalysts for the reactions taking place.

In a hydrogen-oxygen alkaline fuel cell, the reaction at the hydrogen electrode occurs between hydrogen fuel and hydroxyl ions ($OH^-$) present in the electrolyte, which react to form water and release electrons:

$$H_2 + 2OH^- \rightarrow 2H_2O + 2e^-.$$

At the oxygen electrode, oxygen, water, and electrons react in the presence of the oxygen electrode catalyst to reduce the oxygen and form hydroxyl ions ($OH^-$):

$$O_2 + 2H_2O + 4e^- \rightarrow 4OH^-.$$

The flow of electrons is utilized to provide electrical energy for a load externally connected to the hydrogen and oxygen electrodes.

The catalyst in the hydrogen electrode of the alkaline fuel cell has to not only split molecular hydrogen to atomic hydrogen, but also oxidize the atomic hydrogen to release electrons. The overall reaction can be seen as (where M is the catalyst):

$$M + H_2 \rightarrow 2MH \rightarrow M + 2H^+ + 2e^-.$$

Thus the hydrogen electrode catalyst must efficiently dissociate molecular hydrogen into atomic hydrogen. Using conventional hydrogen electrode material, the dissociated hydrogen atoms are transitional and the hydrogen atoms can easily recombine to form molecular hydrogen if they are not used very quickly in the oxidation reaction. The use of a hydrogen storage alloy as the hydrogen electrode catalyst helps solve these problems by storing the hydrogen atoms in metal hydride form, thereby having a supply of hydrogen readily available for the oxidation reaction. Fuel cells utilizing a hydrogen storage alloy in the hydrogen electrode are disclosed in detail in U.S. Pat. No. 6,447,942 to Ovshinsky et al., the disclosure of which is hereby incorporated by reference.

While the hydrogen electrode may be designed to allow for the storage of hydrogen, the oxygen electrode may also be designed for the storage of oxygen. The oxygen electrodes may include a redox couple material which provides for the storage of oxygen via a valency change. The use of redox couples, for oxygen storage in oxygen electrodes are disclosed in detail in U.S. Pat. No. 6,620,539 to Ovshinsky et al., the disclosure of which is hereby incorporated by reference.

The use of a hydrogen storage alloy in the anode and/or non noble metal oxides at the cathode provides a means to absorb energy, e.g. regenerative braking energy in fuel cells. When the incoming charge reaches the metal hydride electrode, electrolysis of the water in the electrolyte takes place at the hydrogen electrode and the hydrogen generated is absorbed by the hydrogen electrode forming a metal hydride. Similarly the incoming charge oxidizes the catalyst materials at the surface of the oxygen electrode to their corresponding oxides. The presence of metal hydride at the hydrogen electrode and/or the metal oxide at the oxygen electrode begins to act like a battery with a finite amount of energy being stored. When the energy supply is ceased, the energy stored in the "battery" can be used to do useful work. Since the operating potential of this power source can be higher than that of the typical alkaline fuel cell, itself, the overall fuel cell efficiency will go up until all the charge from the power source is exhausted. FIG. 1 shows the increase in electrode potential of an alkaline fuel cell upon receiving a pulse of electrical current. FIG. 2 shows the ability of the fuel cell to accommodate pulses of electrical current having different magnitudes.

The length of time for which the higher operating potential lasts depends on the amount of active materials present and the efficiency at which the charge is accepted. In this case it is the amount of metal hydride and metal oxide catalyst present. To increase this time, one can resort to increasing the catalyst loading. However increasing the catalyst loading will have negative consequences to the operation of a normal fuel cell. Therefore, it is highly desirable to obtain alternatives for providing a prolonged higher operating potential in a fuel cell.

SUMMARY OF THE INVENTION

Disclosed herein, is a method for sustaining an elevated operating voltage in a fuel cell comprising a hydrogen electrode having hydrogen storage capacity and/or an oxygen electrode having oxygen storage capacity. The method comprises the steps of 1) providing an initial charging current to the fuel cell to obtain the elevated operating voltage wherein the elevated operating voltage is above the normal operating voltage of the fuel cell, and 2) subsequently providing a continual charging current to the fuel cell to sustain the elevated operating voltage. The elevated operating voltage may be at least 10% above the normal operating voltage. Preferably, the elevated operating voltage is at least 20% above said normal operating voltage. More preferably, the elevated operating voltage is at least 30% above the normal operating voltage. Most preferably, the elevated operating voltage is at least 40% above the normal operating voltage.

The initial charging current and the continual charging current may comprise a continuous electric current, one or more electrical pulses, or a combination thereof. The steps of initially providing the charging current and continually providing the charging current to the fuel cell evolves hydrogen at the hydrogen electrode and/or evolves oxygen at the oxygen electrode, wherein the evolved hydrogen is absorbed by said hydrogen electrode and/or the evolved oxygen is absorbed by the oxygen electrode. The hydrogen electrode may comprise a hydrogen storage material which provides for storage of hydrogen and the oxygen electrode may comprise a redox couple material which provides for storage of oxygen via a change in valency. The initial charging current and the continual charging current may be provided to the fuel cell from one or more power sources selected from batteries, solar cells, generators, regenerative braking, and capacitors.

The fuel cell may be an alkaline fuel cell wherein the elevated operating voltage is greater than or equal to 0.9 V, more preferably greater than or equal to 1.0 V, most preferably greater than or equal to 1.1 V.

Further discloses herein, is an apparatus for sustaining an elevated operating voltage in a fuel cell comprising a hydrogen electrode having hydrogen storage capacity and/or an oxygen electrode having oxygen storage capacity, said apparatus comprising power source in electrical communication with the fuel cell, the power source providing an initial charging current and a continual charging current subsequent to the initial charging current, wherein upon receiving the initial charging current the fuel cell achieves the elevated operating voltage and upon receiving the continual charging current the fuel cell sustains the elevated operating voltage. The elevated operating voltage may be at least 10% above the normal operating voltage. Preferably, the elevated operating voltage is at least 20% above the normal operating voltage. More preferably, the elevated operating voltage is at least 30% above the normal operating voltage. Most preferably, the elevated operating voltage is at least 40% above the normal operating voltage.

The initial charging current and the continual charging current may comprise a continuous electric current, a series of electrical pulses, or a combination thereof. The duration of the electrical pulses may vary as needed for each application, and may range from nanoseconds to seconds.

Upon the fuel cell receiving the initial charging current or the continual charging current, hydrogen is evolved at the hydrogen electrode and/or oxygen is evolved at the oxygen electrode, wherein the evolved hydrogen is absorbed by the hydrogen electrode and/or the evolved oxygen is absorbed by the oxygen electrode. The hydrogen electrode may comprise a hydrogen storage material which provides for the storage of hydrogen. The oxygen electrode may comprise a redox couple material which provides for the storage of oxygen via a change in valency. The power source may comprise one or more selected from batteries, solar cells, windmills, generators, regenerative braking, and capacitors.

The fuel cell is may be an alkaline fuel cell wherein the elevated operating voltage is greater than or equal to 0.9 V, more preferably greater than or equal to 1.0 V, most preferably greater than or equal to 1.1 V.

DETAILED DESCRIPTION OF THE PREFERRED EMBODIMENTS OF THE INVENTION

Figure 1:
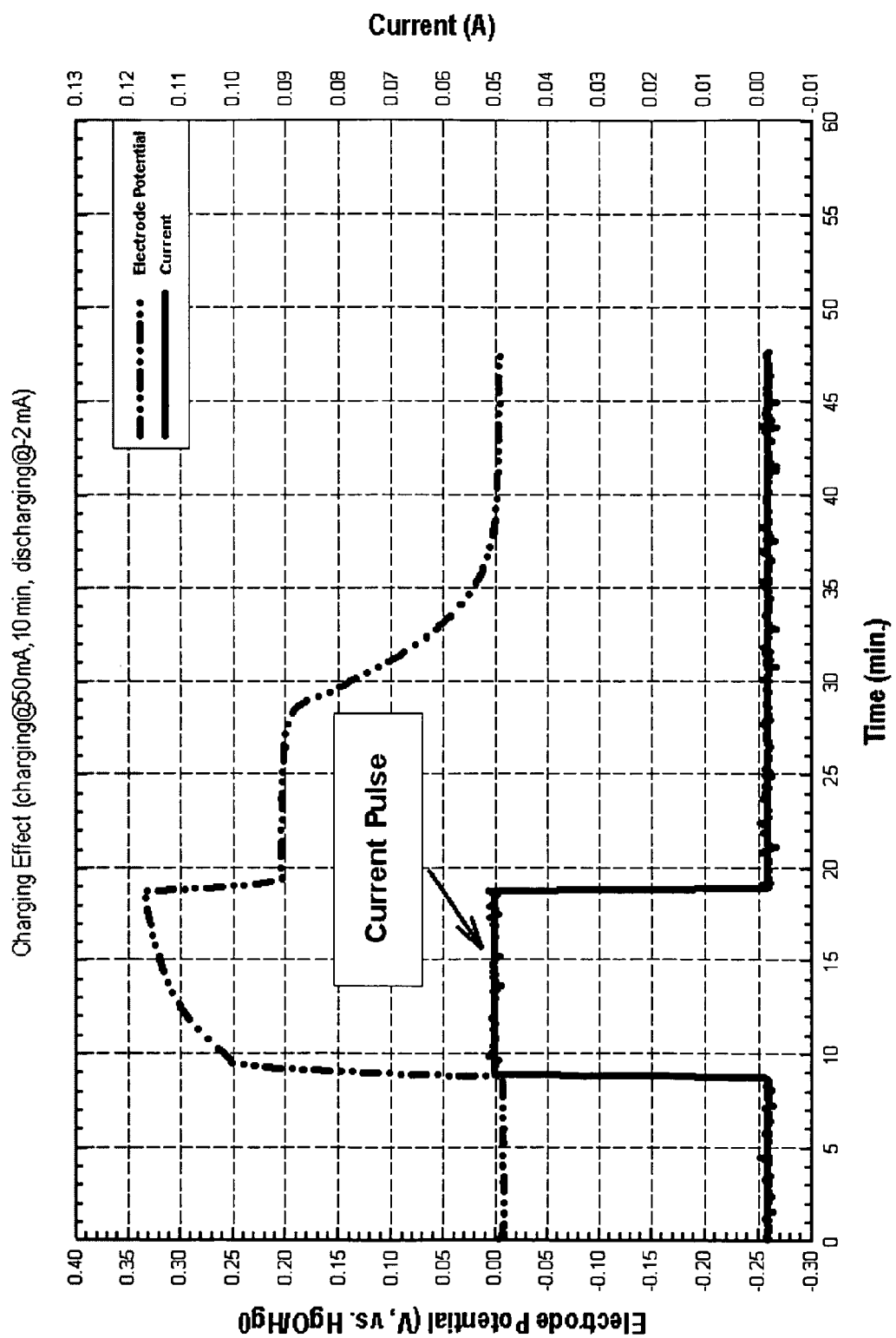
FIG. 1, is a plot showing the increase in electrode potential of an alkaline fuel cell having energy storage capability upon receiving a pulse of electrical current.
Figure 2:
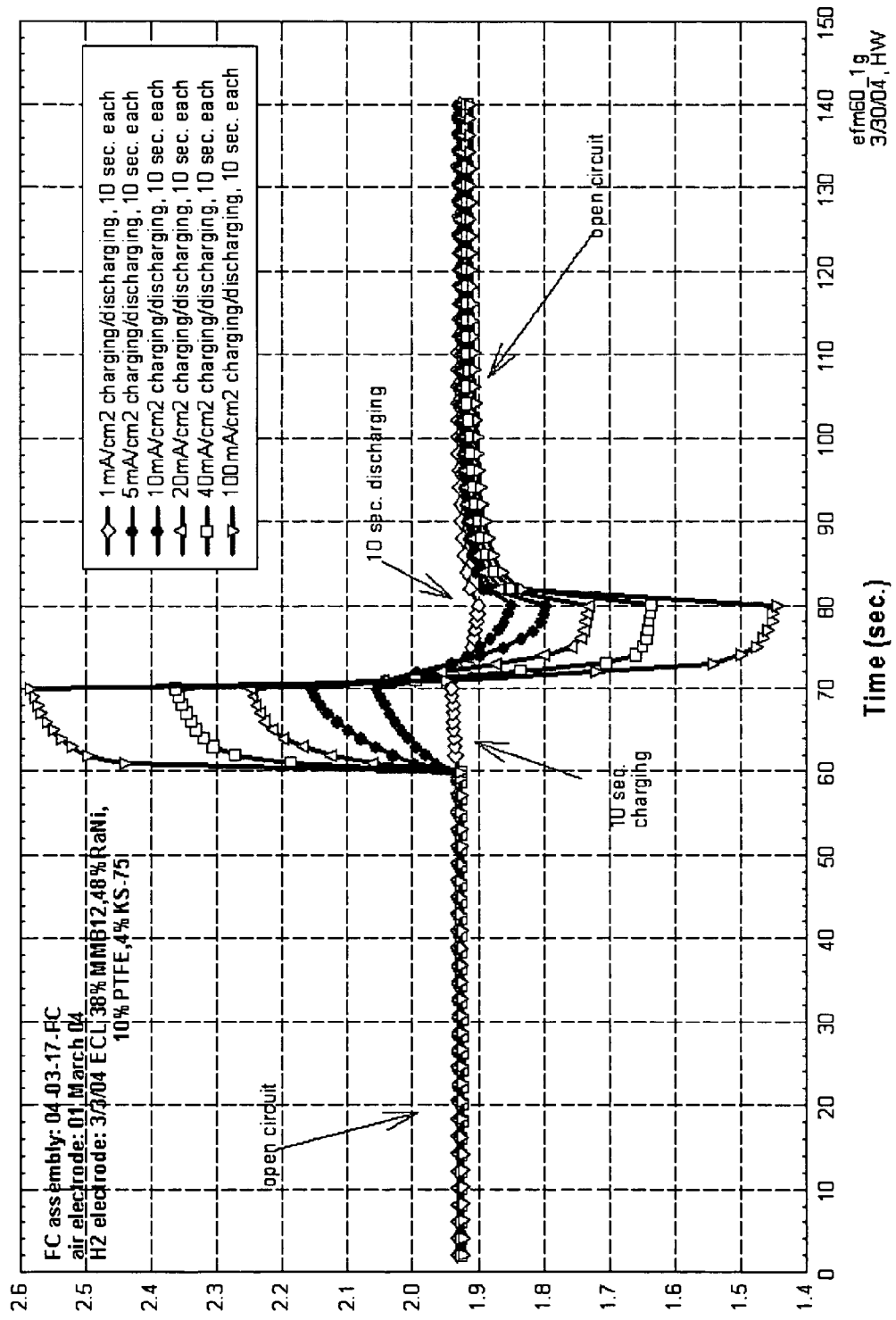
FIG. 2, is a plot demonstrating the ability of an alkaline fuel cell with energy storage capability to accommodate pulses of electrical current having different magnitudes.
Figure 3:
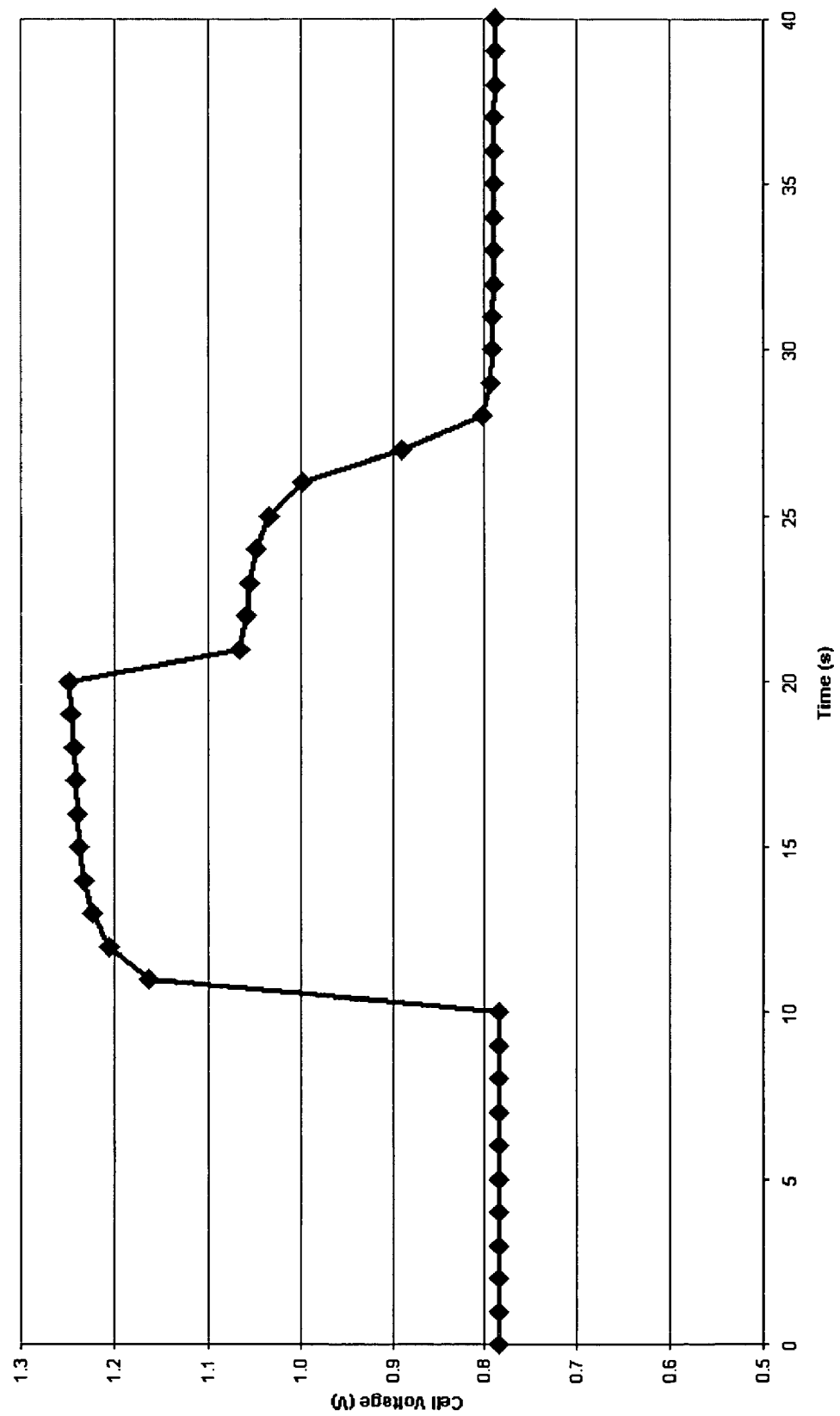
FIG. 3, is a plot showing the increase in operating voltage achieved by an alkaline fuel cell with energy storage capability upon receiving a pulse of electrical current.

In accordance with the present invention there is provided a method for achieving and sustaining a higher operating potential resulting in increased voltage in a fuel cell having energy storage capability. An alkaline fuel cell having a hydrogen electrode with hydrogen storage capability and an oxygen electrode with oxygen storage capability may have a normal operating cell voltage of approximately 0.75V. As shown in FIG. 3, by applying a 100 mA/cm² pulse of electrical current to the alkaline fuel cell, the fuel cell operating voltage increases to over 1.2 volts. By applying the techniques of the present invention the cell voltage of the alkaline fuel cell is able to be sustained well above the normal operating cell voltage. Preferably, the alkaline fuel cell sustains an elevated operating voltage above 0.9 volts. More preferably, the alkaline fuel cell sustains an elevated operating voltage above 1.0 volts. Most preferably, the alkaline fuel cell maintains an elevated operating voltage above 1.1 volts. By varying the amount of electrical current supplied to the fuel cell, the operating voltage of the fuel cell can also be tailored for different applications. The same principles applied to the alkaline fuel cell can be applied to other types of fuel cells such as PEM fuel cells, direct methanol fuel cells, solid oxide fuel cells, molten carbonate fuel cells, phosphoric acid fuel cells, zinc-air fuel cells, or proton ceramic fuel cells.

To acquire and maintain an elevated operating voltage, the fuel cell requires the ability to store a charge. To store a charge, the fuel cell requires the use of a hydrogen electrode providing for the storage of hydrogen and/or an oxygen electrode providing for the storage of oxygen. While the fuel cell only requires a hydrogen electrode with hydrogen storage capacity or an oxygen electrode with oxygen storage capacity, it is preferable to use both a hydrogen electrode with hydrogen storage capacity and an oxygen electrode with oxygen storage capacity within the fuel cell.

The hydrogen electrode with hydrogen storage capacity may comprise an anode active material providing for the storage of hydrogen in metal hydride form. The anode active material may be deposited or supported on a current collector. The current collector may be selected from, but not limited to, an electrically conductive mesh, grid, foam, expanded metal, or combinations thereof. The active material of the hydrogen electrode is generally a hydrogen storage material optionally including a catalytic material. The preferable active material layer is one which can reversibly absorb and release hydrogen irrespective of the hydrogen storage capacity and has the properties of a fast hydrogenation reaction rate, a good stability in the electrolyte, and a long shelf-life. It should be noted that, by hydrogen storage capacity, it is meant that the material stores hydrogen in a stable form, in some nonzero amount higher than trace amounts. Preferred materials will store about 1.0 weight % hydrogen or more. Preferably, the alloys include, for example, rare-earth/Misch metal alloys, zirconium and/or titanium alloys, or mixtures thereof. The active material layer may even be layered such that the material on the hydrogen contacting surface of the active material layer is formed from a material which has been specifically designed to be highly catalytic to the dissociation of molecular hydrogen into atomic hydrogen, while the material on the electrolyte contacting surface is designed to be highly catalytic to the oxidation of hydrogen.

Certain hydrogen storage materials are exceptionally useful as alkaline fuel cell hydrogen electrode materials. The useful hydrogen storage alloys have excellent catalytic activity for the formation of hydrogen ions from molecular hydrogen and also have superior catalytic activity toward the formation of water from hydrogen ions and hydroxyl ions. In addition to having exceptional catalytic capabilities, the materials also have outstanding corrosion resistance toward the electrolyte of the fuel cell. In use, the alloy materials act as 1) a molecular hydrogen decomposition catalyst throughout the bulk of the hydrogen electrode; and 2) as an internal hydrogen storage buffer to insure that a ready supply of hydrogen atoms is always available at the electrolyte contacting surface.

When disposed in a fuel cell having an oxygen electrode with oxygen storage capacity, the hydrogen electrode may not require an active material with hydrogen storage capacity. In such cases, the hydrogen electrode may be any type electrode known in the art for use in alkaline fuel cells, PEM fuel cells, direct methanol fuel cells, solid oxide fuel cells, molten carbonate fuel cells, phosphoric acid fuel cells, zinc-air fuel cells, or proton ceramic fuel cells.

The oxygen electrode may comprise a cathode active material including a redox couple material providing for the storage of oxygen via a valency change. The cathode active material may be deposited or supported on a current collector. The current collector may be selected from, but not limited to, an electrically conductive mesh, grid, foam, expanded metal, or combinations thereof. The redox couple material includes one or more redox couples which store oxygen via a change in valency when the redox couple material is oxidized from its reduced form. Numerous redox couples exist and may be used to form the cathode of this invention. When such couples are used, cycling transition from one valency state (the oxidized form) to another valency state (the reduced form) is accomplished repeatedly and continuously. From a practical point of view, the ability to withstand such cycling is preferred. While not wishing to be bound by theory, some of the redox couples that can be used in the oxygen electrode of the fuel cell of this invention are presented below.

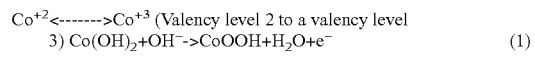

$$Co^{+2} \longleftrightarrow Co^{+3} \text{ (Valency level 2 to a valency level 3)} \quad Co(OH)_2 + OH^- \rightarrow CoOOH + H_2O + e^- \quad (1)$$

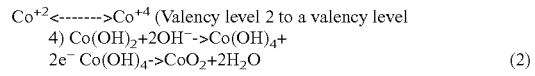

$$Co^{+2} \longleftrightarrow Co^{+4} \text{ (Valency level 2 to a valency level 4)} \quad Co(OH)_2 + 2OH^- \rightarrow Co(OH)_4 + 2e^- \quad Co(OH)_4 \rightarrow CoO_2 + 2H_2O \quad (2)$$

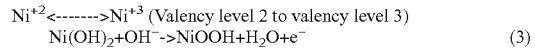

$$Ni^{+2} \longleftrightarrow Ni^{+3} \text{ (Valency level 2 to valency level 3)} \quad Ni(OH)_2 + OH^- \rightarrow NiOOH + H_2O + e^- \quad (3)$$

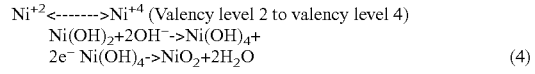

$$Ni^{+2} \longleftrightarrow Ni^{+4} \text{ (Valency level 2 to valency level 4)} \quad Ni(OH)_2 + 2OH^- \rightarrow Ni(OH)_4 + 2e^- \quad Ni(OH)_4 \rightarrow NiO_2 + 2H_2O \quad (4)$$

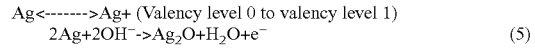

$$Ag \longleftrightarrow Ag^+ \text{ (Valency level 0 to valency level 1)} \quad 2Ag + 2OH^- \rightarrow Ag_2O + H_2O + e^- \quad (5)$$

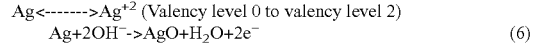

$$Ag \longleftrightarrow Ag^{+2} \text{ (Valency level 0 to valency level 2)} \quad Ag + 2OH^- \rightarrow AgO + H_2O + 2e^- \quad (6)$$

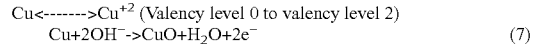

$$Cu \longleftrightarrow Cu^{+2} \text{ (Valency level 0 to valency level 2)} \quad Cu + 2OH^- \rightarrow CuO + H_2O + 2e^- \quad (7)$$

$$(Ni/Ag)^{+2} \longleftrightarrow (Ni/Ag) \quad (8)$$

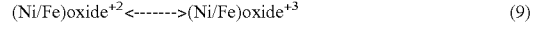

$$(Ni/Fe)oxide^{+2} \longleftrightarrow (Ni/Fe)oxide^{+3} \quad (9)$$

$$Mn^{+2} \longleftrightarrow Mn^{+3} \rightarrow Mn^{+7} \quad (10)$$

$$Sn^{+2} \longleftrightarrow Sn^{+4} \quad (11)$$

Groups 8, 9, 10, and 11 are comprised of multiple elements having multiple valency states. By including materials having mixed valency states, the elevated operating voltage is enabled.

When disposed in a fuel cell having a hydrogen electrode with hydrogen storage capacity, the oxygen electrode may not require an active material with oxygen storage capacity. In such cases, the hydrogen electrode may be any type electrode known in the art for use in alkaline fuel cells, PEM fuel cells, direct methanol fuel cells, solid oxide fuel cells, molten carbonate fuel cells, phosphoric acid fuel cells, zinc-air fuel cells, or proton ceramic fuel cells.

To provide for the higher operating potential within the fuel cell, the fuel cell is reverse biased whereby an initial charging current is provided to the fuel cell to obtain the elevated operating voltage wherein the elevated operating voltage is above the normal operating voltage of the fuel cell, and a continual charging current is subsequently provided to the fuel cell to sustain the elevated operating voltage. The normal operating voltage of a fuel cell is herein defined as the operating voltage of the fuel cell achieved through normal operating conditions without a charging current being supplied to the fuel cell to charge the electrodes.

The initial charging current and the continual charging current may comprise a continuous electric current having a specified duration, one or more electrical pulses, or a combination thereof. The duration of the electrical pulses may vary as needed for each application, and may range from nanoseconds to seconds. The rate at which the initial charging current and the continual charging current are supplied to the fuel cell depends on the type of fuel cell being used. The rate at which the initial charging current and the continual charging current are supplied to the fuel cell is preferably approximate to the rate at which the fuel cell is discharged. The initial charging current and the continual charging current may be supplied to the fuel cell at other rates provided the rates are compatible with the fuel cell.

As the initial charging current or the continual charging current is supplied to the fuel cell, hydrogen is evolved at the hydrogen electrode and/or oxygen is evolved at the oxygen electrode. The hydrogen storage material in the hydrogen electrodes absorbs the evolved hydrogen and forms a metal hydride thereby charging the hydrogen electrode and/or the redox material in the oxygen electrode absorbs the evolved oxygen and forms oxides thereby charging the oxygen electrode. Once the hydrogen electrode and/or the oxygen electrode is charged, an the operating voltage of the fuel cell is increased to an elevated operating voltage. As energy is discharged from the fuel cell, the metal hydride and the oxides formed by the electrical current being supplied to the fuel cell will be utilized as a source of hydrogen or oxygen resulting in their restoration to the original charge status. After at least a portion of the stored energy is removed from the electrode, the electrodes are once again ready to receive hydrogen and/or oxygen upon application of a charge current to the fuel cell. In such a case the operation of the fuel cell mimics the operation of a battery.

Figure 4:
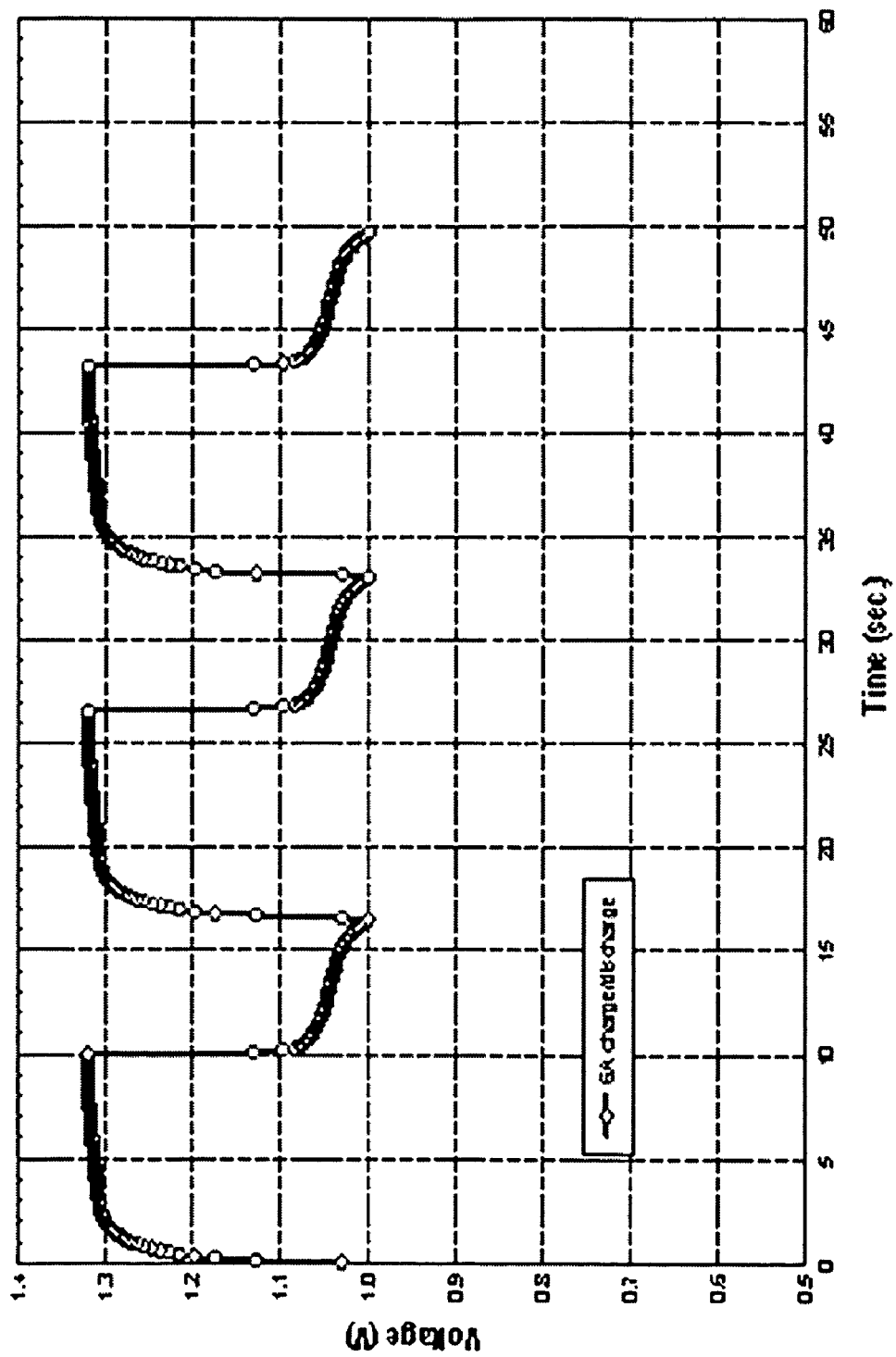
FIG. 4, is a plot demonstrating the concept a sustained elevated operating voltage in a fuel cell having energy storage capability by continually applying a charging current to the fuel cell.

To sustain the increased operating potential, the continual charging current is provided to the fuel cell subsequent to the initial charging current. The continual charging current may be supplied to the fuel cell in a continuous or pulsing manner such that the operating potential of the fuel cell is not allowed to drop below a predetermined level. After receiving the initial charging current, the electrode is not allowed to discharge fully (its potential should not come down to its starting potential prior to applying the initial charging current). This concept is illustrated in FIG. 4, whereby an initial charging current is first applied to a fuel cell and a continual charging current is applied to the fuel cell thereafter not allowing the operating voltage of the fuel cell to drop below 1.0 volts. Since the fuel cell electrodes are not fully discharged, the continual charging current requires a smaller duration charge pulse than the initial charging current. The continual charging current should be of the same magnitude as the initial charging current to restore the electrode potential to the higher value. By repeating this process indefinitely, the overall fuel cell voltage can be maintained at a elevated value. In other words, the operating potential of the fuel cell is artificially kept at a elevated value by charging for slightly longer time and discharging for a lesser time. The charge pulse duration and the discharge pulse duration can be optimized based on the relative efficiencies of charging the hydrogen electrode and the oxygen electrode.

When the charge current is in the form of one or more electrical pulses, the charge to discharge pulse times may be around 80%. In other words the charge pulse will last slightly longer than the discharge pulse. The concept is unique since the pulse duration can be few seconds in the forward and backward direction. It is necessary not to push the potential of the electrodes so that they are irreversibly oxidized (metal hydride electrodes) or corroded heavily (air electrode).

By supplying the charging current to the fuel cell, the fuel cell may sustain an elevated operating voltage at least 10% above the normal operating voltage of the fuel cell. Preferably, the fuel cell sustains an elevated operating voltage at least 20% above the normal operating voltage of the fuel cell. More preferably, the fuel cell sustains an elevated operating voltage at least 30% above the normal operating voltage of the fuel cell. Most preferably, the fuel cell sustains an elevated operating voltage at least 40% above the normal operating voltage of the fuel cell.

The electrical current may be supplied to the fuel cell from one or more electrical power sources internal or external to the fuel cell. The electrical power sources may include one or more selected from batteries, solar cells, generators, regenerative braking, capacitors, power grid, and any other sources of an electrical current. The fuel cell may also have a feed back loop which continually provides the fuel cell with the charge needed to sustain the elevated operating voltage.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

The invention claimed is:

1. A method for sustaining an elevated operating voltage in a fuel cell comprising a hydrogen electrode having hydrogen storage capacity and/or an oxygen electrode having oxygen storage capacity, said method comprising the steps of 1) providing an initial charging current to said fuel cell to obtain said elevated operating voltage, said elevated operating voltage being above a normal operating voltage of said fuel cell; and 2) subsequently providing a continual charging current to said fuel cell to sustain said elevated operating voltage.

2. The method according to claim 1, wherein said elevated operating voltage is at least 10% above said normal operating voltage.

3. The method according to claim 1, wherein said elevated operating voltage is at least 20% above said normal operating voltage.

4. The method according to claim 1, wherein said elevated operating voltage is at least 30% above said normal operating voltage.

5. The method according to claim 1, wherein said elevated operating voltage is at least 40% above said normal operating voltage.

6. The method according to claim 1, wherein said fuel cell is an alkaline fuel cell.

7. The method according to claim 6, wherein said elevated operating voltage is greater than or equal to 0.9 V.

8. The method according to claim 6, wherein said elevated operating voltage is greater than or equal to 1.0 V.

9. The method according to claim 6, wherein said elevated operating voltage is greater than or equal to 1.1 V.

10. The method according to claim 1, wherein said initial charging current comprises a continuous electric current, a series of electrical pulses, or a combination thereof.

11. The method according to claim 1, wherein said continual charging current comprises a continuous electric current, one or more of electrical pulses, or a combination thereof.

12. The method according to claim 1, wherein Initially providing said charging current and continually providing said charging current to said fuel cell evolves hydrogen at said hydrogen electrode and/or evolves oxygen at said oxygen electrode, wherein said evolved hydrogen is absorbed by said hydrogen electrode and/or said evolved oxygen is absorbed by said oxygen electrode.

13. The method according to claim 1, wherein said hydrogen electrode comprises a hydrogen storage material which provides for storage of hydrogen.

14. The method according to claim 1, wherein said oxygen electrode comprises a redox couple material which provides for storage of oxygen via a change in valency.

15. The method according to claim 1, wherein said initial charging current and said continual charging current are provided to said fuel cell from one or more power sources selected from batteries, solar cells, generators, regenerative braking, and capacitors.

16. The method according to claim 1, wherein said initial charging current and said continual charging current are provided to said fuel cell via a feedback loop.

17. An apparatus for sustaining an elevated operating voltage in a fuel cell, said apparatus comprising:
a fuel cell comprising a hydrogen electrode having hydrogen storage capacity and/or an oxygen electrode having oxygen storage capacity, and
a power source in electrical communication with said fuel cell, said power source providing an initial charging current and a continual charging current subsequent to said initial charging current, wherein upon receiving said initial charging current said fuel cell achieves said elevated operating voltage and upon receiving said continual charging current said fuel cell sustains said elevated operating voltage;
said elevated operating voltage being at least 10% above said normal operating voltage.

18. The apparatus according to claim 17, wherein said elevated operating voltage is at least 20% above said normal operating voltage.

19. The apparatus according to claim 17, wherein said elevated operating voltage is at least 30% above said normal operating voltage.

20. The apparatus according to claim 17, wherein said elevated operating voltage is at least 40% above the normal operating voltage.

21. The apparatus according to claim 17, wherein said fuel cell comprises an alkaline fuel cell.

22. The apparatus according to claim 21, wherein said elevated operating voltage of said alkaline fuel cell is greater than or equal to 0.9 V.

23. The apparatus according to claim 21, wherein said elevated operating voltage of said alkaline fuel cell is greater than or equal to 1.0 V.

24. The apparatus according to claim 21, wherein said elevated operating voltage of sail alkaline fuel cell is greater than or equal to 1.1 V.

25. The apparatus according to claim 17, wherein said initial charging current comprises a continuous electric current, one or more electrical pulses, or a combination thereof.

26. The apparatus according to claim 17, wherein said continual charging current comprises a continuous electric current, a series of electrical pulses, or a combination thereof.

27. The apparatus according to claim 17, wherein said initial charging current and said continual charging current evolves hydrogen at said hydrogen electrode and/or evolves oxygen at said oxygen electrode, wherein said, evolved hydrogen is absorbed by said hydrogen electrode and/or said evolved oxygen is absorbed by said oxygen electrode.

28. The apparatus according to claim 17, wherein said hydrogen electrode comprises a hydrogen storage material which provides for the storage of hydrogen.

29. The apparatus according to claim 17, wherein said oxygen electrode comprises a redox couple material which provides for the storage of oxygen via a change in valency.

30. The apparatus according to claim 17, wherein said power source comprises one or more selected from batteries, solar cells, generators, windmills, regenerative braking, and capacitors.

31. The apparatus according to claim 17, wherein said power source comprises a feedback loop.

* * * * *